April 28, 1970
N. F. APLIN
3,508,401
HYDRAULIC TRANSMISSION MECHANISM
Filed Sept. 10, 1968
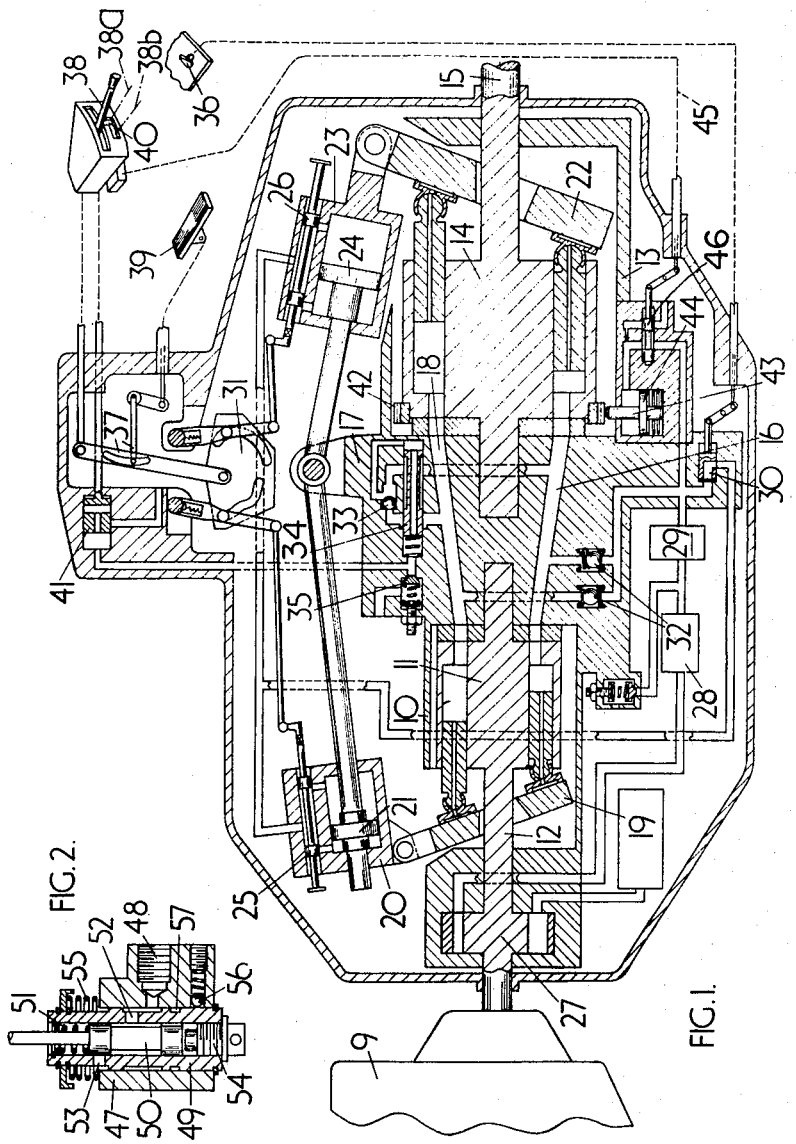
INVENTOR
NEVILLE F. APLIN.
BY Blascock, Downing +
Seebold ATTORNEYS United States Patent Office 3,508,401
Patented Apr. 28, 1970

3,508,401
HYDRAULIC TRANSMISSION MECHANISM
Neville Frederick Aplin, Ainsdale, Southport, England, assignor to Joseph Lucas (Industries) Limited, Birmingham, England,
Filed Sept. 10, 1968, Ser. No. 758,860
Int. Cl. F15b 15/18; F04b 49/00
U.S. Cl. 60—53
5 Claims

ABSTRACT OF THE DISCLOSURE

A hydraulic transmission mechanism comprising a fluid operable motor, a variable stroke pump for supplying motive fluid to the motor through a closed circuit, and a control lever movable by an operator to change the stroke of the pump between zero stroke (corresponding to a neutral position of the transmission) and maximum stroke to vary the speed ratio between the rotary parts of the pump and motor, characterised by valve means arranged to by-pass the pump output when the control lever is moved to an alternative neutral position.

This invention relates to hydraulic transmission mechanisms of the kind comprising a fluid operable motor, a variable stroke pump for supplying motive fluid to the motor, and a control lever movable by an operator to change the stroke of the pump between zero and maximum stroke to vary the speed ratio between the rotary parts of the pump and motor.

It will be understood that when the pump stroke is zero, a neutral position of the transmission is achieved in which no fluid is passed to the motor.

One object of the present invention is to provide convenient means for ensuring that the transmission mechanism is inoperative when the control lever is in one position corresponding to a neutral position even if the pump should tend to move to an "on stroke" position. Other objectives of the invention will become apparent from the following description of an example of the invention.

According to the invention a hydraulic transmission mechanism of the kind specified is characterised by the provision of an alternative neutral position of the control lever, and by valve means arranged to by-pass the pump outlet when the control lever is in said alternative neutral position.

The invention may also reside in means for mechanically locking the motor against rotation in a further alternative neutral position of the control lever.

An example of the invention will now be described with reference to the accompanying drawings which illustrate an embodiment for use on a tractor vehicle.

In the accompanying drawings:

FIGURE 1 is a diagrammatic longitudinal sectional view of the mechanism,

FIGURE 2 is a sectional view of a valve for use in a modified construction,

Referring first to FIGURE 1 of the drawings, there is provided a swash-plate type pump 10, the rotor 11 of which is arranged to be driven by the engine 9 of the tractor vehicle through the shaft 12. Arranged back-to-back with the pump 10 is a fluid operable motor 13 of the swash-plate type having a rotor 14 connected to the output shaft 15 for driving the tractor wheels through a differential mechanism (not shown). The normal outlet of the pump 10 is connected to the normal inlet of the motor 13 through a passage 16 formed in a port block 17, and the normal outlet of the motor 13 is connected to the normal inlet of the pump 10 through a passage 18 in the block 17. However, the swash-plate 19 of the pump 10 is of the kind which can be moved through a position of zero obliquity to an opposite inclination to provide for a reverse condition in which the outlet of the pump acts as an inlet, and vice versa so that the motor 13 will be rotated in the opposite direction.

The swash-plate 19 is connected to the cylinder 20 of a servo-mechanism containing a piston 21 connected to the fixed port block 17. The swash-plate 22 of the motor 13 is also angularly adjustable, and for this purpose is connected to the cylinder 23 of another servo-mechanism containing a piston 24 connected to the port block 17. Fluid pressure is admitted to the cylinders 20, 23 under the control of two spool valves 25, 26 respectively from a boost pump 27 mounted on the shaft 12, the fluid being supplied via a cooler 28, filter 29 and a valve 30 to be referred to hereinafter.

The valves 25, 26 are connected by links to a cam device diagrammatically illustrated at 31, whereby the swash-plate 22 is maintained at a position of maximum stroke whilst the swash-plate 19 is moving from zero obliquity to maximum obliquity, whereafter any continued movement of the device 31 in a direction to increase the speed of the rotor 14 in relation to the rotor 11, will maintain the swash-plate 19 at maximum obliquity whilst reducing the obliquity of the swash-plate 22 to provide an "overdrive" condition.

Fluid pressure from the pump 27 is also supplied from a point intermediate the filter 29 and valve 30 via one or other of a pair of uni-directional valves 32 to whichever of the passages 16, 18 is at lower pressure. Moreover, whichever of the passages 16, 18 is at higher pressure is connected by a high pressure selector valve 33 to one end of a cylinder containing a spring-loaded spool 34 of a relief valve. The spool 34 incorporates an annular recess defined between lands, and a restricted axial bore. Furthermore, a pilot relief valve 35 arranged to open when a predetermined pressure is exceeded, is connected to the opposite end of the cylinder. In operation, the higher of the two pressures in the passages 16, 18 (i.e. that in passage 16 as shown) acts on the end of the spool 34 remote from the valve 35. When the pressure in the passage 16 exceeds the predetermined value, the valve 35 opens to permit escape of fluid, thus causing a substantial pressure drop across the spool 34. As a result the spool moves to the left (as viewed) and connects the passage 16 to the passage 18 through the annular recess.

The mechanism thus far described follows known practice except for the provision of the valve 30. The valve 30 is a variable restrictor, the setting of which can be determined by a driver operable control 36. The purpose of the valve 30 is to permit variations in the speed of response of the swash-plates 19, 22 to changes in the setting of the cam device 31.

The setting of the cam device 31 is determined by mechanism as described in the specification of my Patent No. 3,276,286 such mechanism being illustrated diagrammatically by the levers 37. As described in the said specification, the mechanism includes a hand control lever 38 and a pedal 39, and the arrangement is such that movement of either of these driver operable means will vary the degree of adjustment of the cam device 31 for a given movement of the other driver operable means.

It will be seen that the hand control lever 38 is mounted within a quadrant provided with a gate 40. When the lever 38 is aligned with the gate 40 (as shown) the cam device 31 is in a position to cause the swash-plate 19 to be at zero obliquity, thereby providing a normal neutral position. Angular movement of the lever from this position in one direction will provide for a gradually increasing speed ratio in a forward direction, and angular movement in the opposite direction will result in a gradually increasing speed ratio in the reverse direction. However, movement of the lever 38 across the gate to an alternative neutral position indicated in dotted lines at 38a will cause opening of a valve 41 (FIGURE 1). The valve 41 is connected intermediate the spool 34 and valve 35. Thus opening of the valve 41 will have the same effect as opening of the valve 35, and will cause the spool 34 to interconnect the passages 16, 18. As a result the alternative neutral position provides a positive neutral position in which fluid from the pump outlet will be bypassed to the pump inlet should the swash-plate 19 for any reason tend to move from zero obliquity.

If the lever 38 is moved angularly from the alternative neutral position to a further alternative neutral position indicated in dotted lines at 38b in FIGURE 1, not only is the valve 41 maintained open to provide a positive neutral position, but the rotor 14 of the motor is positively locked against rotation. For this purpose the rotor 14 is provided with peripheral teeth 42 with which a spring loaded radially slidable plunger 43 can co-act. In normal operation the plunger 43 is held out of engagement with the teeth 42 (against the action of its spring) by fluid pressure derived from the pump 27 acting on a piston 44 or diaphragm connected to the plunger. However, as the lever 38 is moved to the position 38b, it actuates (through cable 45) a valve 46 which cuts off the supply of fluid from the pump 27 to the chamber containing the piston 44 or diaphragm and at the same time allows fluid to escape from this chamber to a point at low pressure. As a result the plunger 43 will move under the action of its spring into engagement with the teeth 42 on the rotor 14.

In some instances it may be required to provide means whereby the transmission mechanism will be moved into a positive neutral position in the event that the driver panics, and moves the pedal 39 to an extreme position corresponding to maximum speed ratio. For this purpose the valve 41 shown in FIGURE 1 may be replaced by the novel form of valve shown in FIGURE 2.

Referring to FIGURE 2 there is provided a body 47 having an inlet 48 adapted for connection to a point between the spool 34 and valve 35 (FIGURE 1). The inlet 48 communicates with a cylindrical bore in which is an axially slidable and spring loaded sleeve 49. Moreover, within a bore in the sleeve is a relatively slidable spool valve 50 which is loaded by a spring 51 acting between the spool and the sleeve.

In the periphery of the sleeve 49 is an annular peripheral groove which establishes communication between the inlet 48 and a radial port 52 in the sleeve at all permitted axial settings of the sleeve, whilst at a position axially removed from the port 52, is an exhaust port 53 in the sleeve. Furthermore, one end of the sleeve 49 is engaged by a screw threaded plug 54 which serves both as a stop for the spool 50 and also as a connector for attachment to means through which the sleeve can be moved against the action of its spring 55 upon movement of the pedal 39 to the extreme position.

The spool 50, which is movable by the lever 38, incorporates a pair of lands separated by an annular space in communication with the port 52.

In FIGURE 2 the valve is shown in the closed position in which one of the lands of the spool 50 covers the port 53. If the control lever 38 is moved through the gate 40 to one of its alternative positions the spool 50 will be raised (as viewed) in relation to the sleeve 49 and thereby establish communication between the ports 52, 53. Alternatively, should the pedal 39 be moved to the aforesaid extreme position, the sleeve 49 will be moved downwardly (as viewed) in relation to the spool 50 to achieve the same effect. During this movement both springs 51, 55 will be compressed. When the sleeve is moved down, a spring-loaded ball 56 in a radial bore in the body engages a circumferential groove 57 in the sleeve, to retain the latter until positively raised by the upward movement of the spool 50 as the control lever is moved to a positive neutral position. This upward release of the sleeve will be effected when the spool 50 is raised due to the spring 51 being fully compressed when the sleeve is locked by the ball 53.

In a modification (not illustrated) the plunger 43 can be actuated mechanically by the lever 38 when the lever is moved to the position 38b.

Having thus described my invention what I claim as new and desire to secure by Letters Patent is:

1. A hydraulic transmission mechanism of the kind specified characterized by the provision of a neutral position of the control lever, an alternative neutral position of the control lever, and valve means arranged to bypass pump output when the control lever is in said alternative neutral position.

2. A hydraulic transmission mechanism as claimed in claim 1, incorporating means for mechanically locking a motor against rotation in a further alternative neutral position of the control lever.

3. Hydraulic transmission mechanism as claimed in claim 2 in which said means for mechanically locking the motor comprises teeth rotatable with a rotor of the motor, and a hydraulically operable plunger engageable with said teeth.

4. A hydraulic transmission mechanism as claimed in claim 3 in which the plunger is loaded into engagement with the teeth by a spring, and is movable out of engagement with the teeth by hydraulic pressure supplied to the plunger under the control of a valve operable by the control lever.

5. A hydraulic transmission mechanism comprising in combination, a fluid operable motor, a swash plate type pump for supplying fluid to the motor in a closed circuit, the swash plate of the pump being movable through a position of zero obliquity (corresponding to a neutral position of the transmission) to opposite inclinations to provide for forward and reverse operation of the motor, a servo mechanism for moving the swash plate, a control lever movable by an operator to control the servo mechanism, a spool valve arranged to interconnect the passage between the pump and motor, and thereby by-pass the motor, when the pressure drop through a restricted passage in the spool exceeds a predetermined value, and a valve arranged to be moved to an open position when the control lever is moved to an alternative neutral position so as to cause said spool to interconnect said passages.

References Cited

UNITED STATES PATENTS 3,191,382 6/1965 Weisenbach.
3,354,981 11/1967 Swanson et al.
3,451,218 6/1969 Grant.

EDGAR W. GEOGHEGAN, Primary Examiner

U.S. Cl. X.R.

3—41; 60—52